US006497130B2

(12) United States Patent
Nilsson

(10) Patent No.: US 6,497,130 B2
(45) Date of Patent: Dec. 24, 2002

(54) METHOD FOR CORRUGATING A METAL FOIL AND PACKAGES OF SUCH FOIL

(75) Inventor: Sven Melker Nilsson, Kållered (SE)

(73) Assignee: Kemira Metalkat Oy (FI)

( * ) Notice: Subject to any disclaimer, the term of this patent is extended or adjusted under 35 U.S.C. 154(b) by 43 days.

(21) Appl. No.: 09/779,702

(22) Filed: Feb. 9, 2001

(65) Prior Publication Data

US 2001/0021462 A1 Sep. 13, 2001

(30) Foreign Application Priority Data

Feb. 11, 2000 (SE) .............................................. 0000429

(51) Int. Cl.[7] ........................... B32B 3/28; B21D 13/10; B01J 35/04; F01N 3/28

(52) U.S. Cl. ..................... 72/252.5; 72/379.6; 428/603; 502/527.22

(58) Field of Search ............................ 72/252.5, 379.6; 502/527.22; 428/593, 603, 599; 422/180

(56) References Cited

U.S. PATENT DOCUMENTS

| | | | | | |
|---|---|---|---|---|---|
| 2,769,479 | A | * | 11/1956 | Getz | 153/77 |
| 3,208,131 | A | * | 9/1965 | Ruff et al. | 29/157 |
| 3,958,626 | A | * | 5/1976 | Klein | 165/8 |
| 3,998,600 | A | * | 12/1976 | Wallis | 29/180 |
| 4,098,722 | A | * | 7/1978 | Cairns et al. | 252/466 |
| 4,402,871 | A | * | 9/1983 | Retallick | 252/477 |
| 4,719,680 | A | | 1/1988 | Cyron | |
| 4,888,320 | A | * | 12/1989 | Ihara et al. | 502/304 |
| 5,085,268 | A | * | 2/1992 | Nilsson | 165/8 |
| 5,130,208 | A | * | 7/1992 | Maus et al. | 428/593 |
| 5,316,997 | A | * | 5/1994 | Toyoda et al. | 502/314 |
| 5,664,450 | A | * | 9/1997 | Stoynoff, Jr. | 72/44 |
| 5,983,692 | A | | 11/1999 | Brück | |
| 6,136,450 | A | * | 10/2000 | Maus | 428/593 |
| 6,187,274 | B1 | * | 2/2001 | Nilsson | 422/180 |

FOREIGN PATENT DOCUMENTS

| | | | |
|---|---|---|---|
| EP | 0 542 805 B1 | | 1/1994 |
| EP | 0 604 868 B1 | | 7/1994 |
| JP | 2-180644 | * | 7/1990 |
| SE | 8702771-0 | | 1/1989 |
| WO | WO 93/02792 | | 2/1993 |

* cited by examiner

*Primary Examiner*—John J. Zimmerman
(74) *Attorney, Agent, or Firm*—Rothwell, Figg, Ernst & Manbeck, P.C.

(57) ABSTRACT

A method for corrugating a metal foil (11), which together with a longitudinally flat foil (12) is intended to form a foil package pervious to liquid or gas, where the folds are made with a very small fold radius by rolling in at least two steps between rollers (42, 43) disposed in pairs, the fold radius (51) being large and the fold height (52) low in a first step, and after the final step, the fold radius (53) is less than 10%, preferably 2 to 5% of the fold distance (55), and the fold height (54) is greater than after the first step.

4 Claims, 3 Drawing Sheets

METHOD FOR CORRUGATING A METAL FOIL AND PACKAGES OF SUCH FOIL

BACKGROUND

Winding corrugated and flat thin metal foils together in a cylindrical package for use in rotating heat exchangers, exhaust gas purifiers or sound dampers is previously known. A plurality of longitudinal ducts will be formed between the corrugated and the flat foil, allowing a stream of gas or liquid to flow through the ducts. These applications have the common feature of aiming at achieving a large contact area between the foil and the flow, with the front surface limited. In addition, it is desirable to keep the pressure drop over the foil body low, partly in order to reduce the need for pump action, and partly to avoid damages that might break the foil package. Conventional techniques for retaining a foil package are point welding, soldering or transverse folds, as described in EP 604,868, U.S. Pat. No. 4,719,680 and WO93/02792.

The foil package is usually equipped with various layer coatings, for instance active layers of platinum metal with carriers in exhaust gas purifiers, or hygroscopic layers in heat exchangers. In this conjunction, another aim is to be able to add such layers with as even a thickness as possible, and without agglomerations at the duct angles, since locally thicker layers restrict the flow-through area and entail unnecessary consumption of layer material, which often is expensive.

In conventional applications, the foil folds have a relatively great radius or contact surface with the flat foil, and in that case the flow will not contact these surfaces. The purpose of the present invention is to provide a corrugated metal foil so as to increase the flow-through area, reduce the flow resistance and cut the material consumption for layer coating.

SUMMARY OF THE INVENTION

In accordance with the present invention, a method for corrugating a metal foil is disclosed, in which an originally flat metal foil is rolled in at least two steps between fluted rollers disposed in pairs. In a first step, the roller grooves have a radius at their top which accounts for 10% or more of the distance between the groove tops. In a final step, the roller grooves have a radius at their top which is smaller than the radius in the first step.

BRIEF DESCRIPTION OF DRAWINGS

The invention is described with reference to the figures, of which

DETAILED DESCRIPTION OF THE INVENTION

Figure 1:
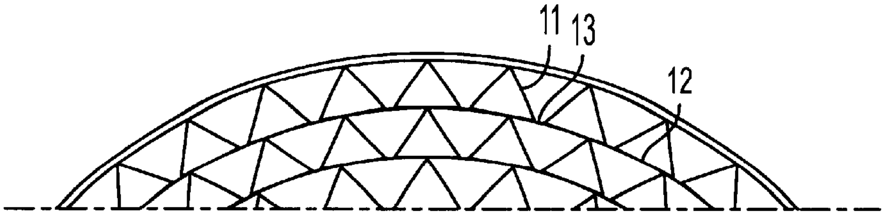
FIG. 1 is a cross-sectional view of the foil package.

U.S. Pat. No. 4,719,680 and EP 542,805, for instance, disclose corrugated metal foils as components of packages through which gases flow, and, as shown in FIG. 1, they have usually been carried out by winding a corrugated foil (11) together with a flat foil (12). In accordance with conventional techniques, the corrugated foil has been carried out with sinoidal or rounded folds in order to avoid the risk of cracks in the foil, which has become relatively rigid and fragile due to the rolling. Owing to the rounded shape, there will be limited bending stresses, which are distributed over a larger portion of the foil. In the cases where the foils are joined by means of welding, gluing or soldering, a large contact surface may be desired, where the foils are in mutual contact (13) in order to achieve a strong binding.

Corrugation with a rounded fold shape is conventionally performed by pulling an originally flat foil between two axially fluted rolls. By means of friction against the groove tops, the foil is prevented from gliding towards these, and the fold profile is formed by simultaneous bending and longitudinal stretching of the foil. However, in order to maintain the foil thickness and to limit the risk of cracks, longitudinal stretching should be limited, implying that the folds should be carried out one by one as far as possible, by choosing rolls with small diameters, but again, such rolls would become flexible, making it difficult to achieve high-precision corrugation. Using conventional techniques, it is difficult to make folds whose depth accounts for more than 35% of the fold distance, whose fold radius accounts for more than 12% of the fold distance, and which have an over 45 degree inclination towards the longitudinal direction.

Figure 3:
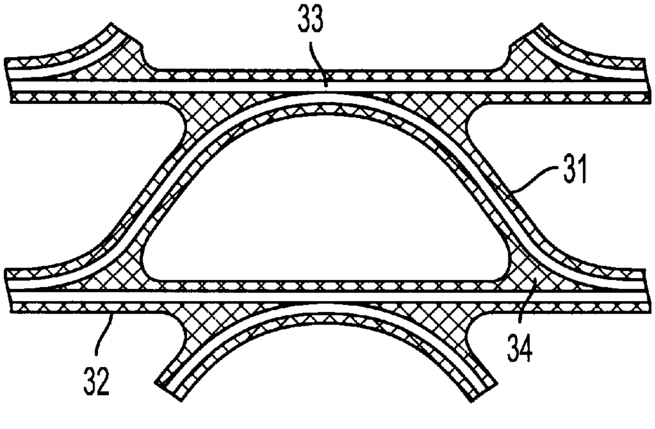
FIG. 3 (CONVENTIONAL ART)
FIG. 3 is a flow duct with the foil corrugated in accordance with known techniques.

The fold radius is crucial for the flow resistance and the utilisation of the foil surface, since, as in the prior art shown in FIG. 3, the foils are located next to each other within a large area in the vicinity of the point (33) where the corrugated foil (31) touches the smooth foil (32). The narrow cross-section in this area will cause an agglomeration (34) of layer material, which reduces the flow-through area and forms thick layers, entailing unnecessarily high consumption of the frequently expensive layer material, and with a surface considerably smaller than the foil surface. In conventional foil packages, it is often possible to utilise only 80 to 85% of the foil surface. In WO93/02792 the portion of the fold with a convex rounded shape is replaced with three sharp part folds in order to allow soldering material to accumulate in a sharply defined limited joint without layer material accumulating, but in this case as well, the adjacent foil portions will be impossible to use.

Figure 2:
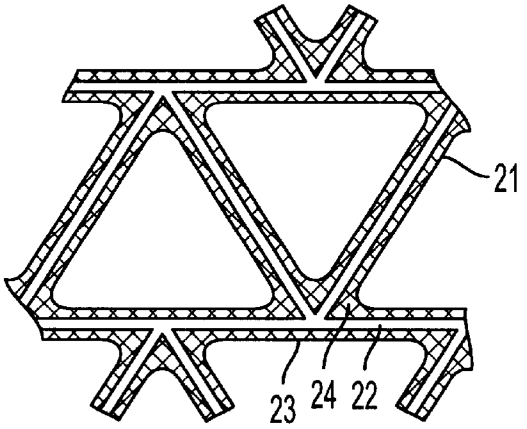
FIG. 2 is an enlarged detail of a flow duct with the foil corrugated in accordance with the invention.

A flow duct embodiment that allows for low flow resistance and use of a large portion of the foil (21, 22) surface is such where the duct cross-section is an equilateral triangle with sharp 90 degree comers, as shown in FIG. 2. With this design, the accumulation of layer material occurring in the corners (23) will be minimised. The demands on the size of the contact surface can be alleviated with the foil package retained in some other manner, for instance by tangential depressions and protuberances as in SE 87,02771-0, the utilised portion of the foil surface increasing to 95% or more as the fold radius decreases.

Figure 4:
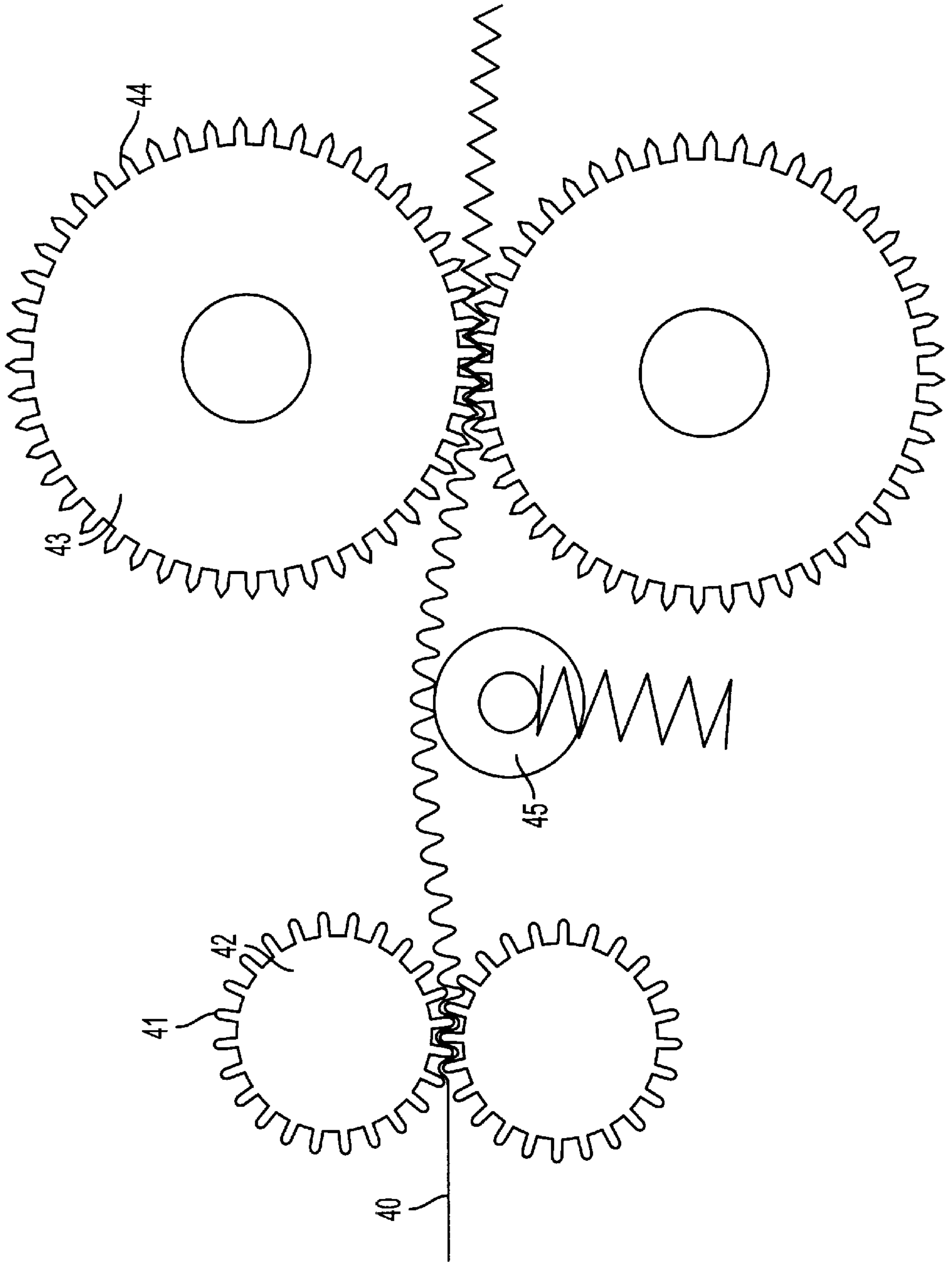
FIG. 4 is a roller system for corrugating foils in accordance with the invention.

In order to allow folds with a greater depth and a smaller fold radius to be formed, the corrugation of the invention takes place in two steps in a rolling mill shown in FIG. 4. In the first step, the originally flat foil (40) is conventionally formed with folds of a relatively large radius, as in FIG. 3, by rolling between a pair of fluted rollers (42) of relatively small diameter, thus allowing longitudinal stretching and bend stresses to be limited, because only a few grooves are simultaneosuly in contact with the foil. The grooves (41) have been made with such a large radius that the foil strip (40) is allowed to glide over the grooves without being damaged. In the first step, the folds are made with a slightly smaller height than the final one, but with a large radius and slightly curved sides, so as to provide a side length equal to that of the final fold, whose fold radius is smaller. After the first step, the corrugated foil is kept flat and stretched by means of one single spring-loaded roller (45).

Figure 5:
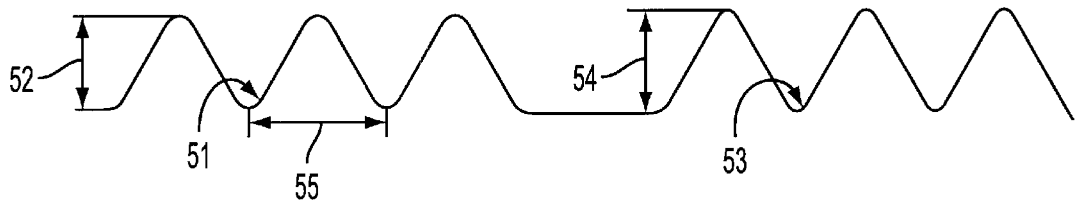
FIG. 5 is a corrugated foil in accordance with the invention.

In the second, final step, the corrugation is then made deeper by rolling between a pair of rollers (43) of larger diameter, shown in FIG. 4, and narrow grooves (44) of small radius, which touch the foil only at the bottom of the folds made first. The grooves are high, but can still be lifted from the folds since they are narrow. The increased height of the folds is compensated without any longitudinal stretching by straightening the previously curved portions of the sides, and this allows an appreciable reduction of the fold radius without the risk of cracks and ruptures, and without any mutual sliding between the foil and the grooves. Owing to the larger roller diameter, the folds can be formed with high precision. As shown in FIG. 5, after the first step, the folds may for instance have a height (52) of 2.43 mm and a fold radius (51) of 0.4 mm, and after the second step, a height (54) of 2.62 mm and a radius (53) of 0.1 mm with a fold distance (55) of 3.3 mm.

In rolling mills in accordance with the invention, only one of the rollers of a pair of rollers needs to be motor-driven.

Figure 6:
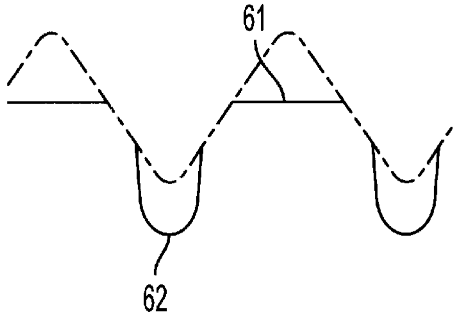
FIG. 6 is an optional embodiment of a corrugated foil of the invention.

Rolling mills in accordance with the invention can also be used for corrugating foils to the shape of FIG. 6, which is disclosed in patent WO97/21489, where the final shape of the folds comprises part depressions (61) at the fold top and part protuberances (62) at the fold bottom. During the rolling, depressions and protuberances form tangential rows, which cooperate with tangential grooves in the smooth foil and retain the foil package without soldering or welding. This form of a fold is very difficult to achieve in one single corrugating operation, but is easy to carry out as a final step of a foil that has been first corrugated with the proper fold distance, but with larger fold radius. The method of the invention provides better security and higher precision than the one proposed in U.S. Pat. No. 5,983,692, in which the entire corrugated foil has tangential grooves before corrugation and the roller grooves are interrupted at the ducts, so that the folds in these are formed without control of their shape.

Foil packages of the type described above are used i.a. for catalysts in exhaust gas systems, in which the foil is made of chromium steel, and for rotating heat exchangers using a highly resistant aluminium alloy. In both these cases, it is vital for the operation to have intact oxide layers without cracks on the foil surface, and this has been difficult to achieve with conventional techniques.

What is claimed is:

1. A method for corrugating a metal foil, by rolling an originally flat metal foil in at least two steps between fluted rollers disposed in pairs, the method comprising:

a first step of rolling the metal foil between fluted rollers having a radius at their top, which accounts for 10% or more of the distance between the groove tops, and a final step of rolling the metal foil between fluted rollers having a radius at their top which is smaller than the radius in the first step.

2. A corrugating method as defined in claim 1, wherein a fold height after the final step is greater than a fold height after the first step.

3. A corrugating method as defined in claim 1, wherein only one of the rollers of a pair of rollers used in a step is directly motor-driven.

4. A corrugating method as defined in claim 1, wherein in the final step, the grooves of the one roller has protuberances on a smaller section of its length and the grooves of the second roller have recesses on a smaller section of its length.

* * * * *